United States Patent
Bernal et al.

(10) Patent No.: US 11,086,092 B2
(45) Date of Patent: Aug. 10, 2021

(54) CAMERA LENS HEATER

(71) Applicant: Integrated Micro-Electronics Inc., Laguna (PH)

(72) Inventors: Jay Augustus S. Bernal, Cebu (PH); Arnel V. Evangelista, Cavite (PH); Christopher Lawrence S. Tiongson, Pasig (PH)

(73) Assignee: Integrated Micro-Electronics Inc., Laguna (PH)

( * ) Notice: Subject to any disclaimer, the term of this patent is extended or adjusted under 35 U.S.C. 154(b) by 354 days.

(21) Appl. No.: 16/181,033

(22) Filed: Nov. 5, 2018

(65) Prior Publication Data

US 2019/0137723 A1 May 9, 2019

Related U.S. Application Data

(60) Provisional application No. 62/581,038, filed on Nov. 3, 2017.

(51) Int. Cl.
| | |
|---|---|
| G02B 7/02 | (2021.01) |
| G02B 7/00 | (2021.01) |
| H04N 5/225 | (2006.01) |
| H05B 3/06 | (2006.01) |
| H05B 3/84 | (2006.01) |
| G02B 27/00 | (2006.01) |

(52) U.S. Cl.
CPC ............... *G02B 7/02* (2013.01); *G02B 7/008* (2013.01); *G02B 27/0006* (2013.01); *H04N 5/2254* (2013.01); *H05B 3/06* (2013.01); *H05B 3/84* (2013.01)

(58) Field of Classification Search
CPC ........ G02B 7/02; G02B 7/008; G02B 27/006; H05B 3/06; H05B 3/84; H04N 5/2254
See application file for complete search history.

(56) References Cited

U.S. PATENT DOCUMENTS

2019/0094484 A1* 3/2019 Hasegawa .............. G02B 13/14

* cited by examiner

*Primary Examiner* — Jack Dinh
(74) *Attorney, Agent, or Firm* — Reising Ethington P.C.

(57) ABSTRACT

A lens assembly for a camera module is disclosed that includes a lens barrel having a base portion at a distal end, the base portion positioned at an object-side of the lens assembly; a plurality of optical elements disposed in a stacked arrangement within the lens barrel along an optical axis; an objective lens having a first surface facing the object-side of the lens assembly and a second surface opposing the first surface; a heating assembly having an annular-shaped heating element disposed on the second surface of the objective lens, the heating element configured to produce heat when an electrical current is caused to flow through it; and a lens cap attached in mating engagement to the base portion of the lens barrel securing the objective lens therebetween.

22 Claims, 4 Drawing Sheets

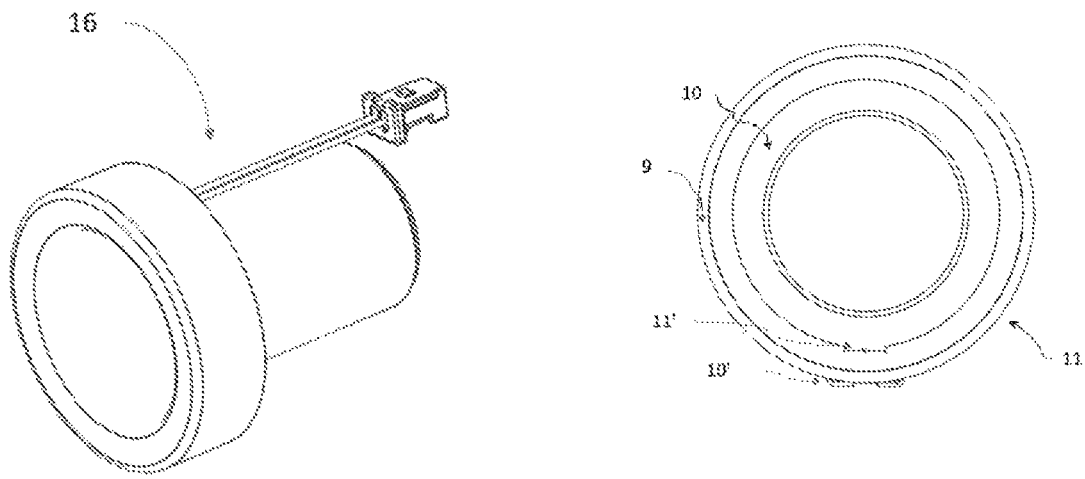
FIGURE 3
FIGURE 5
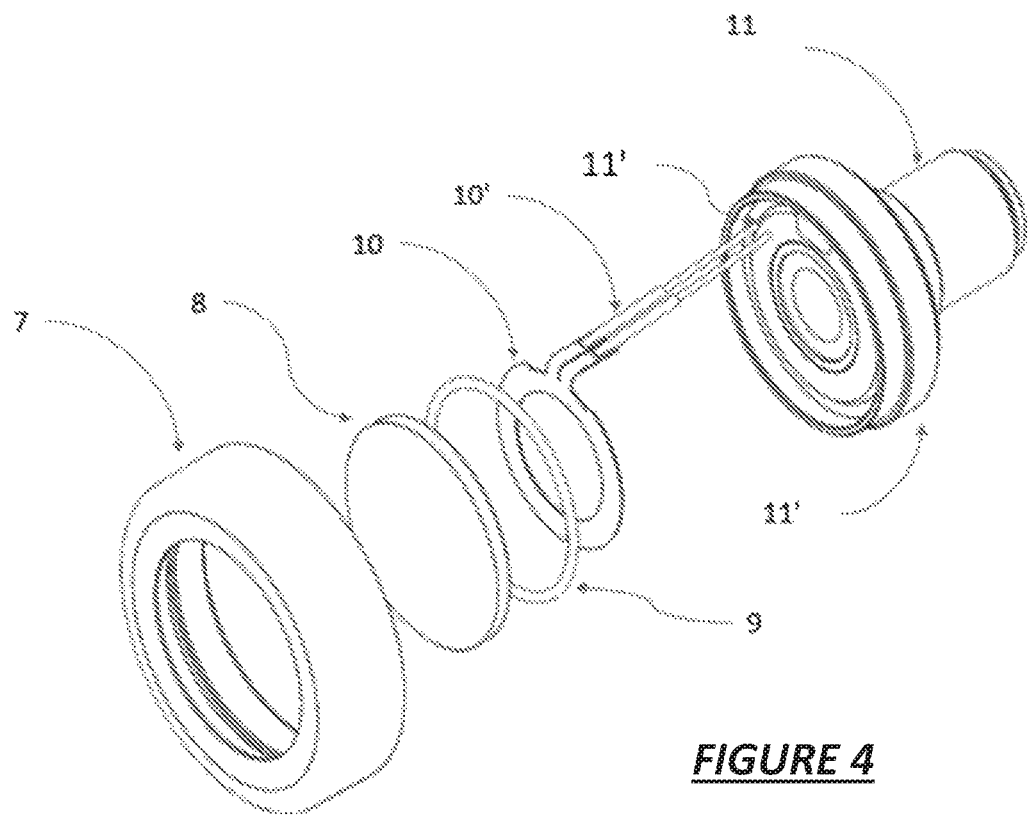
FIGURE 4

CAMERA LENS HEATER

CROSS-REFERENCE TO RELATED APPLICATION

This application claims the benefit of U.S. Patent Application No. 62/581,038, filed Nov. 3, 2017, the entire contents of which are hereby incorporated by reference.

TECHNICAL FIELD

The present invention relates generally to camera modules, and more particularly, to camera modules for machine vision applications that are mounted to an exterior portion of a vehicle.

BACKGROUND

For safety purposes, cameras used for automotive machine vision applications are subject to various regulations and industry standards relating to image quality and environmental robustness. For cameras that are mounted to a vehicle exterior, these standards generally necessitate the use of heater systems to combat the effects of cold and wintery environments. For example, the reliability and effectiveness of an advanced driver assistance or autonomous driving system depends on the clarity of the camera module's field of vision. Mist, vapor, and frost on the lens of the camera are a few of the factors that can impact the lucidity of the camera. During winter, high exterior humidity and low temperatures result in frost or ice layers that form on the exterior surface of the camera lens. Significant de-icing time is often required when the camera lens or protective cover glass are thoroughly chilled.

When incorporating a heating system into a camera module, the position of the heater is to be considered as the position of the heater can impact the energy efficiency and the heat irradiated zone control of the camera, as well as become mechanically challenging and costly. The position of the heater also affects the complexity of installation during the manufacturing process.

Many externally mounted cameras utilize a mechanical housing with a cover glass to protect the camera unit from environmental factors. In these cameras the heater is often installed at the vicinity of the cover glass or around the housing. For example, U.S. Pat. No. 9,618,828, titled "Camera with Heating Element," discloses a camera that includes at least one heating element adapted for heating a group of circuit boards, the optical elements, and the housing, wherein at least one heating element is directly attached to one of the circuit boards of the group of circuit boards. In this design, the heating element is in contact with the unitary housing, which causes the heat energy to flow from the housing and into the cover glass to achieve de-fogging or de-icing. In addition, U.S. Patent Publ. No. 2006/0108352, titled "Image-Acquisition Module Comprising a Heating Device . . . to Monitor the Exterior of a Motor Vehicle," discloses a camera module enclosed in a housing where the objective lens is protected by a cover glass. The heating element is in a form of a resistive ink or a paste that is applied around the internal surface of the transparent cover. Another technique described in U.S. Pat. No. 3,495,259, titled "Electrically Heated Device," suggests vapor depositing a ring shaped resistive metallic layer directly around the objective lens and/or the surface of a viewing lens element just outside the optically active zone. This technique, however, requires a rigorous process during manufacturing and is not conducive for automotive applications.

SUMMARY

According to an embodiment of the invention, there is provided a lens assembly for a camera module that includes a lens barrel having a base portion at a distal end, the base portion positioned at an object-side of the lens assembly; a plurality of optical elements disposed in a stacked arrangement within the lens barrel along an optical axis; an objective lens having a first surface facing the object-side of the lens assembly and a second surface opposing the first surface; a heating assembly having an annular-shaped heating element disposed on the second surface of the objective lens, the heating element configured to produce heat when an electrical current is caused to flow through it; and a lens cap attached in mating engagement to the base portion of the lens barrel securing the objective lens therebetween.

According to another embodiment of the invention, there is provided a camera module that includes a lens assembly comprising a lens barrel having a base portion at a distal end, the base portion positioned at an object-side of the lens assembly; a plurality of optical elements disposed in a stacked arrangement within the lens barrel along an optical axis; an objective lens having a first surface facing the object-side of the lens assembly and a second surface opposing the first surface; a heating assembly having an annular-shaped heating element disposed on the second surface of the objective lens, the heating element configured to produce heat when an electrical current is caused to flow through it; and a lens cap attached in mating engagement to the base portion of the lens barrel securing the objective lens therebetween; and a substrate having an image sensor in optical alignment relative to the lens assembly and control circuitry configured to supply current to the heating element.

BRIEF DESCRIPTION OF THE DRAWINGS

One or more embodiments of the invention will hereinafter be described in conjunction with the appended drawings, wherein like designations denote like elements, and wherein:

FIG. 3 illustrates an assembled lens assembly in accordance with an embodiment of the invention;

FIG. 4 illustrates an exploded view of the objective lens assembly in accordance with an embodiment of the invention;

FIG. 5 a top view of the objective lens assembly in accordance with an embodiment of the invention.

DETAILED DESCRIPTION OF THE ILLUSTRATED EMBODIMENT(S)

Figure 1:
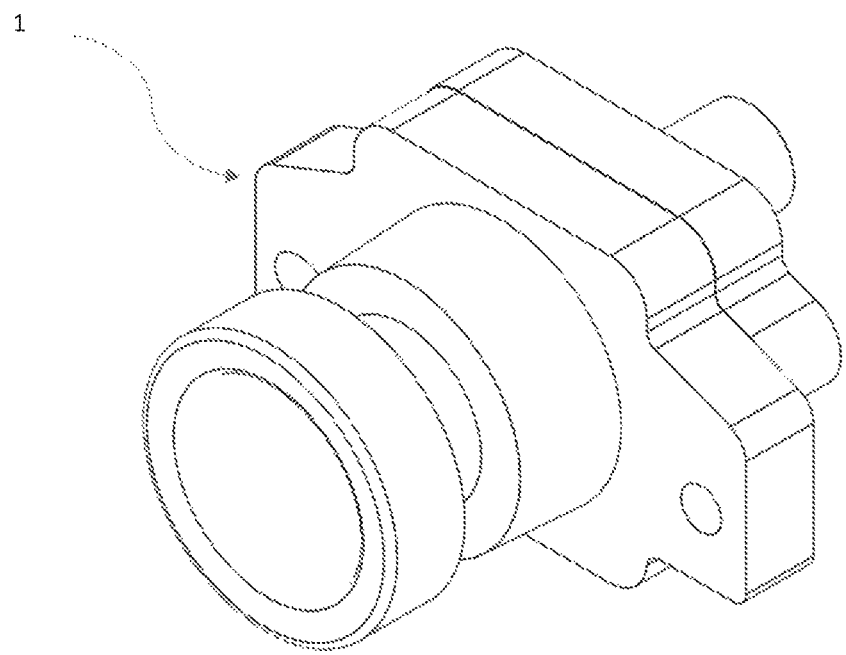
FIG. 1 illustrates an exemplary camera module assembly in accordance with an embodiment of the invention.

The system and method described below are directed to an objective lens assembly for a camera module. In one embodiment, the camera module is an automotive camera module 1 as shown in FIG. 1, which may be used, for example, as a forward-looking camera, a rear-view camera, a side mirror replacement camera, or as a 360° view image acquisition unit. The disclosed lens assembly may also be implemented to aircraft that experiences lens frosting when flying at very high altitude. Without a transparent protective enclosure, the objective lens will be exposed to extreme dry, wet, and/or freezing conditions. Proper sealing is implemented on the front housing of the camera as well as in between front lens and its cap to prevent entry of particle or moisture. The challenge with an automotive camera is where to position the heater where it is easy to assemble during production and where it doesn't affect the optical performance of the camera. The heater must be well protected from all varying weather conditions so it doesn't wear out easily. The heat transfer should be efficient, without using too much heat energy and electrical power to achieve the required temperature of the lens. The disclosed camera module addresses these challenges by integrating the heating system within the camera module.

Figure 2:
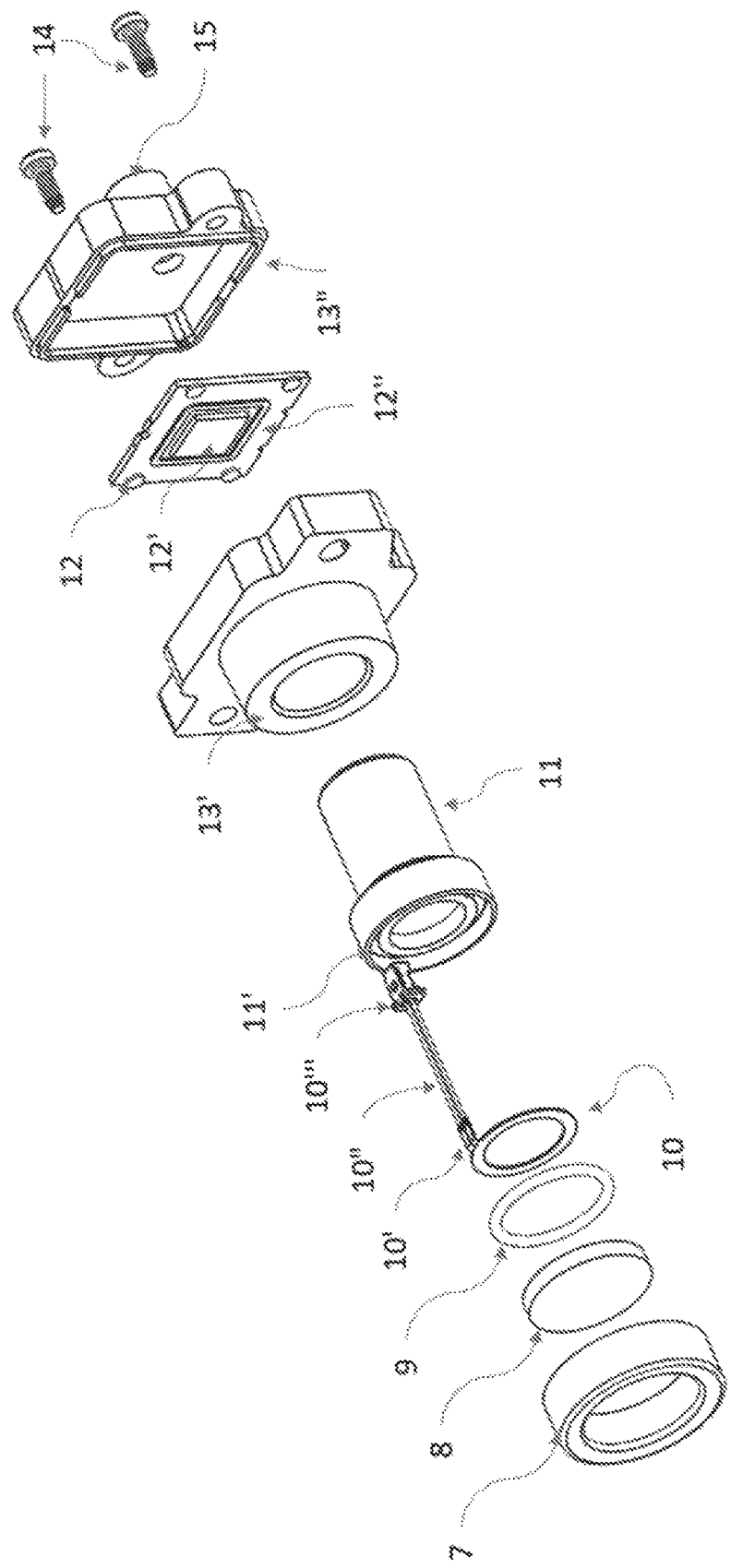
FIG. 2 illustrates an exploded side view of the exemplary camera module in accordance with an embodiment of the invention.

FIG. 2 illustrates an exploded view of an exemplary camera system implementing the disclosed objective lens assembly having an integrated heater assembly and electronic components associated with connection mechanisms. According to an embodiment, the objective lens assembly 16 includes a lens barrel 11 having a base portion 11' at a distal end, the base portion 11' positioned at the object-side of the lens assembly 16. The lens barrel 11 has a cylindrical shape with a generally hollow internal space. The base portion 11' has a larger diameter than the diameter of the remaining body portion of the lens barrel 11. A plurality of optical elements are disposed in a stacked arrangement within the lens barrel 11 along an optical axis. The optical elements include a number of lenses and spacers, which are disposed between the lenses in order to adjust gaps there between.

The camera module includes an image sensor 12' mounted on a substrate 12, which in one embodiment, is a printed circuit board (PCB). The PCB 12 may include other circuits, for example, for noise reduction, circuit protection, image processing, and control circuitry for power supply and regulation, and in particular, current supply for the heating assembly. In one embodiment, the image sensor 12' is an integrated circuit.

The lens assembly 16 further includes a front objective lens element 8 having a first surface facing an object-side of the lens assembly 16 and a second surface that opposes the first surface facing an image-side of the lens assembly 16. In one non-limiting example, the front lens element 8 is made from flint or crown glass coated with various coatings including, but not limited to, an anti-reflective coating, an anti-scratch coating, an oleophobic coating, a hydrophobic coating, a hydrophilic coating, or other protective thin films so that the objective lens element 8 can optically withstand extreme weather conditions.

The lens assembly 16 further includes a heating assembly having an annular-shaped heating element 10 concentrically installed directly to the second surface objective lens element 8. Direct contact of the heating element 10 with the objective lens element 8 maximizes the amount of thermal energy directed to the front lens element 8, thereby optimizing heat efficiency. This also makes the assembly process less complicated because the heater 10 is mounted or pasted as part of the lens stack. In one embodiment, the heating element comprises an ohmic heater, e.g. a wire made of resistive material or a resistive trace printed on a substrate. The heating element may be made of positive-temperature-coefficient (PTC) material, i.e. a material the electrical resistance of which increases with increasing current flowing across it. The resistive ink or paste may be, for example, of the type including graphite, Cu, Ag or Cu—Ag. When the resistive ink or paste is weldable, the connecting wire(s) can be directly connected to the heating element 8. When the resistive ink or paste is not weldable, a layer of weldable conductive ink or paste may be incorporated into a portion of the heating element in order to execute the connection of the wires. The heating element may also be made from polymer thick film prints which are electrically conductive components that may include graphene, carbon nanotubes, carbon black (carbon particles, such as soot), graphite or mixtures of these.

As described in further detail below, the heat is generated by applying electrical current into the heating element 10, which in one example, is a thin resistive material. The heater may be activated whenever a sensor, e.g., a temperature sensor (internal or external to the camera module), detects a low environmental temperature, poor image quality, or by a driver's disposition. The heater assembly is situated inside the objective lens assembly 16 and camera housing making it well protected from direct environmental factors. In operation, the heating element 10 is configured to gradually reach a target temperature (e.g., just enough to melt the ice on the lens) using a low power in a short period of time. Even at extremely low temperatures and wintery conditions, the applied heat (temperature) on the lens will have no permanent influence on the lens components, even on plastic aspheric lenses, which affects the optical performance of the imaging system. In general, the materials used for the objective lens should withstand temperature within −40° C. to 85° C.

FIG. 3 illustrates an assembled lens assembly 16 having the heating assembly installed therein. The heater system is assembled during the stacking of the lens elements and mechanical components. FIG. 4 illustrates an exploded view of the objective lens assembly 16. An annular-shaped heating element 10 is installed on the front objective lens element's 8 second surface. The front lens element 8 and the base portion 11' of the lens barrel 11 are configured to accommodate the heater element 10 and rubber O-ring 9 without affecting rays along the optically active area of the lens assembly 16. FIG. 5 is a top view that shows the position of the heater element 10 and the 0-ring 9 on the top of the base portion 11' of the lens barrel 11. The O-ring 9 is inserted with a small space concentrically around the heating element 10 to protect the lens and camera system from containments such as dust and/or water ingress. This ensures that the lens and camera components are protected and to avoid fogging caused by moisture inside when there is differential temperature between the inner and outer side of the lens assembly. A heater wire 10" connected to the heating element 10 by a connector 10' is inserted out of an aperture or slot in an outer portion of the base portion 11' of the lens barrel 11. The heater wire 10" is then inserted into an aperture or slot in the front housing 13'. A sealing glue is applied into the lens barrel aperture where the connecting heater wire 10" is inserted. A lens cap 7 is attached to the lens barrel 11 and glued to lock and seal the objective lens assembly 16. In one embodiment, the lens cap is screwed by a threaded connection to the base portion 11" of the lens barrel 11. The lens cap 7 applies a downward force to properly stack the lens components and squeeze the O-ring 9 and heater element 10. After assembly, the lens undergoes several optical tests such as MTF, stray light, air leak test and knock test to ensure that all components are properly in place. And finally, the assembly is sealed using glue between the lens cap 7 and the base portion 11" of the lens barrel 11.

This objective lens assembly 16 will now be ready to be installed to a heater system compatible camera module.

Figure 6:
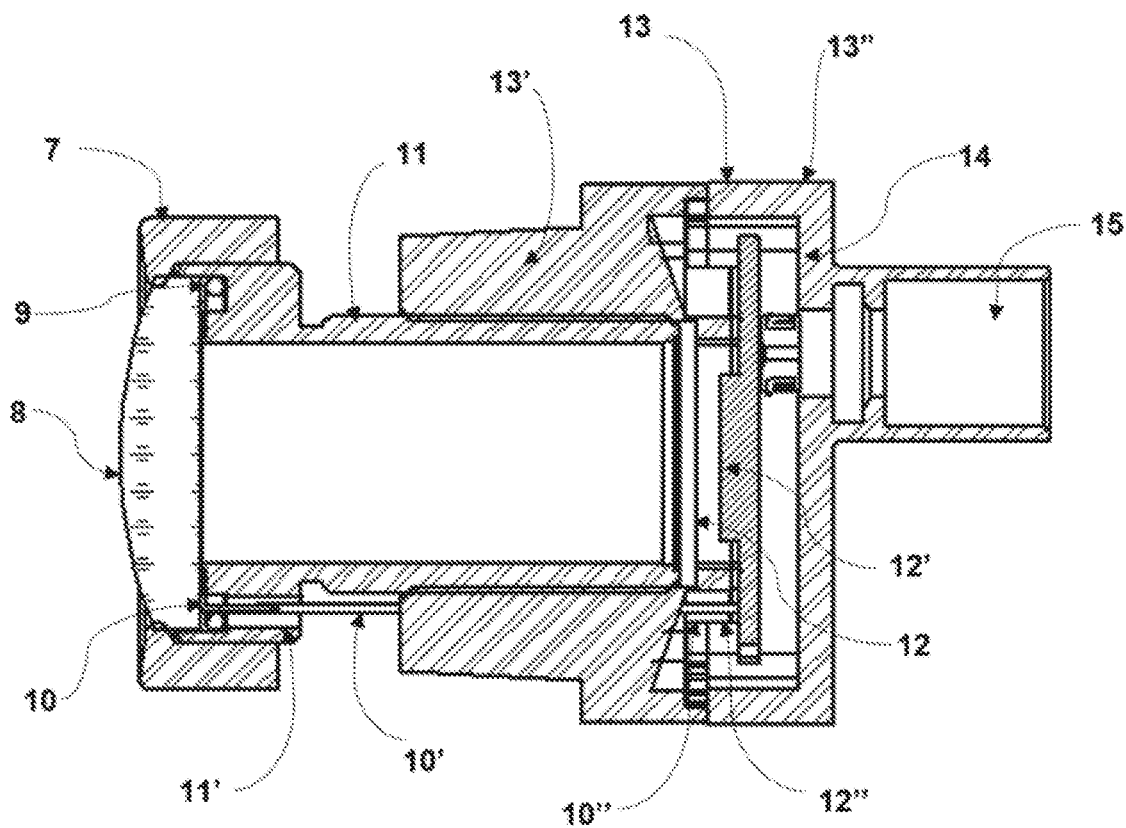
FIG. 6 illustrates an objective lens assembly assembled to a camera module in accordance with an embodiment of the invention.

FIG. 6 illustrates the objective lens assembly 16 assembled to a camera. The objective lens 16 with front housing 13' is coupled to PCB 12 by active aligning it with the image sensor 12'. A male heater connector 10''' at the end of the heater wire 10'' is connected to a female connector 12'' on the PCB 12 through a slot in the front camera housing 13'. A back housing 13'' encloses the whole camera module. The front housing 13' and the back housing 13'' may be held together with screws 14. Alternatively, an adhesive may be used to attach the back housing 13'' to front housing 13', or when both front 13' and back 13'' housing are made of plastic, they can be attached to each other using ultrasonic welding. The housing is sealed to ensure that the camera will be free from any material leakage that goes in the device. This camera is then enclosed to a mountable case with lens protruding outside, and connected to a vehicle ECU through connector 15 ready for vehicle mounting.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A lens assembly for a camera module, the lens assembly comprising:
   a lens barrel having a base portion at a distal end, the base portion positioned at an object-side of the lens assembly;
   a plurality of optical elements disposed in a stacked arrangement within the lens barrel along an optical axis;
   an objective lens having a first surface facing the object-side of the lens assembly and a second surface opposing the first surface;
   a heating assembly having an annular-shaped heating element disposed on the second surface of the objective lens, the heating element configured to produce heat when an electrical current is caused to flow through it; and
   a lens cap attached in mating engagement to the base portion of the lens barrel securing the objective lens therebetween.

2. The lens assembly of claim 1, wherein the heating assembly includes a wire connected at one end to the heating element and at an opposite end to a control circuit for supplying current to the heating element via the wire.

3. The lens assembly of claim 2, wherein the wire extends from the heating element in a direction substantially perpendicular to the second surface of the objective lens through an aperture in the base portion of the lens barrel.

4. The lens assembly of claim 1, wherein the wire extends in an axial direction along an outer surface of the lens barrel.

5. The lens assembly of claim 1, wherein the heating element is an ohmic heating element.

6. The lens assembly of claim 1, wherein the heating element is at least one of a wire made from a resistive material, a resistive printed trace, a resistive ink, or a resistive paste.

7. The lens assembly of claim 1, wherein the first surface of the objective lens includes at least one of an anti-reflective coating, an anti-scratch coating, an oleophobic coating, a hydrophobic coating, and a hydrophilic coating.

8. The lens assembly of claim 1, further including an o-ring disposed concentrically around an outer diameter of the heating element for sealing the lens assembly from ingress of contaminants.

9. The lens assembly of claim 1, wherein the lens cap is attached in mating engagement to the base portion of the lens barrel via an adhesive.

10. The lens assembly of claim 1, wherein the lens cap is threaded to the base portion of the lens barrel.

11. A camera module comprising:
    a lens assembly including:
       a lens barrel having a base portion at a distal end, the base portion positioned at an object-side of the lens assembly;
       a plurality of optical elements disposed in a stacked arrangement within the lens barrel along an optical axis;
       an objective lens having a first surface facing the object-side of the lens assembly and a second surface opposing the first surface;
       a heating assembly having an annular-shaped heating element disposed on the second surface of the objective lens, the heating element configured to produce heat when an electrical current is caused to flow through it; and
       a lens cap attached in mating engagement to the base portion of the lens barrel securing the objective lens therebetween; and
    a substrate having an image sensor in optical alignment relative to the lens assembly and control circuitry configured to supply current to the heating element.

12. The camera module of claim 11, wherein the heating assembly includes a wire connected at one end to the heating element and at an opposite end to the control circuitry for supplying current to the heating element via the wire.

13. The camera module of claim 12, wherein the wire is connected to the control circuitry via a male connector at the opposite end of the wire that connects with a female connector on the substrate.

14. The camera module of claim 12, wherein the wire extends from the heating element in a direction substantially perpendicular to the second surface of the objective lens through an aperture in the base portion of the lens barrel.

15. The camera module of claim 12, wherein the wire extends in an axial direction along an outer surface of the lens barrel.

16. The camera module of claim 11, wherein the heating element is an ohmic heating element.

17. The camera module of claim 11, wherein the heating element is at least one of a wire made from a resistive material, a resistive printed trace, a resistive ink, or a resistive paste.

18. The camera module of claim 11, wherein the first surface of the objective lens includes at least one of an anti-reflective coating, an anti-scratch coating, an oleophobic coating, a hydrophobic coating, and a hydrophilic coating.

19. The camera module of claim 11, further including an o-ring disposed concentrically around an outer diameter of the heating element for sealing the lens assembly from an ingress of contaminants.

20. The camera module of claim 11, wherein the lens cap is attached in mating engagement to the base portion of the lens barrel via an adhesive.

21. The camera module of claim 11, wherein the lens cap is threaded to the base portion of the lens barrel.

22. The camera module of claim 11, wherein the substrate is a printed circuit board.

\* \* \* \* \*